(12) United States Patent
Park et al.

(10) Patent No.: US 7,394,977 B2
(45) Date of Patent: Jul. 1, 2008

(54) APPARATUS AND METHOD FOR CREATING 3-DIMENSIONAL IMAGE

(75) Inventors: Sung-Joo Park, Seoul (KR); Se-Yern Oh, Siheung-si (KR)

(73) Assignee: Openvr Co., Ltd., Seoul (KR)

( * ) Notice: Subject to any disclaimer, the term of this patent is extended or adjusted under 35 U.S.C. 154(b) by 64 days.

(21) Appl. No.: 10/574,705

(22) PCT Filed: Oct. 6, 2004

(86) PCT No.: PCT/KR2004/002551

§ 371 (c)(1),
(2), (4) Date: Apr. 5, 2006

(87) PCT Pub. No.: WO2005/034041

PCT Pub. Date: Apr. 14, 2005

(65) Prior Publication Data

US 2007/0120843 A1    May 31, 2007

(30) Foreign Application Priority Data

| Oct. 7, 2003 | (KR) | ........................ 10-2003-0069622 |
| Jan. 31, 2004 | (KR) | ........................ 10-2004-0006408 |
| Jan. 31, 2004 | (KR) | ........................ 10-2004-0006409 |

(51) Int. Cl.
*G03B 15/00* (2006.01)
*G03B 17/00* (2006.01)
*G03B 19/00* (2006.01)
*G06K 9/00* (2006.01)
*G06T 15/00* (2006.01)

(52) U.S. Cl. .................. 396/5; 396/428; 396/429; 382/154; 348/E13.002; 345/419

(58) Field of Classification Search ............ 396/5, 396/419, 424, 428, 429; 382/154, 285; 348/E13.002, 348/E13.022, E13.067; 345/419, 652, 663, 345/678, 6

See application file for complete search history.

(56) References Cited

U.S. PATENT DOCUMENTS

| 5,857,119 A | 1/1999 | Borden |
| 6,343,184 B1 | 1/2002 | Huebner |
| 6,762,755 B2 | 7/2004 | Chen |
| 2003/0030636 A1 * | 2/2003 | Yamaoka ..................... 345/419 |

* cited by examiner

*Primary Examiner*—Rochelle-Ann Blackman
(74) *Attorney, Agent, or Firm*—Finnegan, Henderson, Farabow, Garrett & Dunner, L.L.P.

(57) ABSTRACT

The present invention relates to a apparatus and method for generating 3-dimensional image, which comprises a image photographing part composed of a camera part, a turn table part, a photographing angle adjustment part, a X-axis adjustment part, and a Y-axis adjustment part; a image photographing control part that creates movement control signals, transmits to said image photographing part, and receives plural digital images photographed by said camera part; a 3-dimensional image generating part that creates 3 dimensional images by using said plural digital images; and a storage part that stores said plural digital images and said 3-dimensional images. The present invention thus provides 3-dimensional images to consumers to see a certain product with its actual view by rotating at a wanted angle.

17 Claims, 10 Drawing Sheets

APPARATUS AND METHOD FOR CREATING 3-DIMENSIONAL IMAGE

RELATED APPLICATION

This application is based upon and claims the benefit of priority to Korean Application Nos. KR 10-2004-0006409 filed Jan. 31, 2004, KR 10-2004-0006408 filed Jan. 31, 2004, and KR 10-2003-0069622 filed Oct. 7, 2003, the entire contents of which are incorporated herein by reference.

FIELD OF THE INVENTION

The present invention relates to an apparatus and method for generating 3-dimensional image, more particularly to an apparatus and method for generating 3-dimensional image enable to generate 3D image by the shortest time by photographing an image of object 3-dimensionally at a super-high speed.

BACKGROUND OF THE INVENTION

Use of electronic commerce, virtual museums, digital encyclopedias and electronic catalogs using of digital media such as internet, CD-ROM, and the like continues to show an upward tendency. In those cases, in order to make visual approach to objects more effectively through virtual reality, it is necessary to offer 3-dimensional image as well as 2-dimensional image such as a picture for providing satisfactory 3-dimensional sense through binocular vision as if there are real objects in front of consumer's eyes and making it possible that consumer can select freely posture for watching or the direction of watching.

As stated, use of 3D contents increases gradually in order to achieve various purposes for offering education effect, practical information about goods, etc. However, a general method for offering conventional 3D contents is that after taking pictures of a photographic object (e.g., sculpture, product for sale, etc.) manually at numerous angles, an operator creates one 3D image by composition of photographed pictures or that an operator takes moving picture and offers moving picture file.

A method of generating one 3D image by composition of numerous photographed pictures has merit to be able to offer images corresponding to consumer's demand (e.g., spectator, purchasers, etc.), but it has demerit that a number of pictures has to be taken for generating 3D image, that it takes a lot of time to photograph an object, and that a process for generating 3D image is complicated. In result, it increases the cost of generating 3D image. Furthermore, it can often happen to restart photographing job from the beginning in case that centers of all pictures taken are not identical at the time of photographing a photographic object many times. There is another drawback that operating errors caused by the difference between the optic angle and camera lens' angle can occur.

In comparison, a method for offering moving picture file by taking moving pictures has merit that time for generating an electronic file can be shortened and that it is easy to create electronic file, because an object is photographed continuously by using excellent photographing devices and then one electronic file can be offered. But it has problem that consumers cannot freely get images from the angle they want. Moreover, there is limitation on advertising numerous products or materials since Web Server for offering file is not able to operate properly (for example, 'down', etc.) due to too large size of established moving picture file.

That is, a method for offering 3D contents based on conventional technologies has numerous problems such as creating cost, operating time, operating cost, consumer's dissatisfaction, etc.

DETAILED DESCRIPTION OF THE INVENTION

Technical Problem

In order to overcome the defects associated with the conventional technologies is it an object of the present invention to provide an apparatus and method for generating 3-dimensional image wherein the apparatus and method produces 3-dimensional image enable to show to consumers a certain product with its actual view by rotating at a wanted angle.

It is another object of the present invention to provide an apparatus and method for generating 3-dimensional image enable to minimize creation cost, operation time, and operator's tasking endeavor.

It is still another object of the present invention to provide an apparatus and method for generating 3-dimensional image enable to create 3D image easily even if the consumer is a beginner not familiar with operation control of 3D image generating device.

It is still another object of the present invention to provide an apparatus and method for generating 3-dimensional image enable to maximize operator's convenience by operating automatically to photograph an object at a wanted-angle with only one command.

It is also still another object of the present invention to provide an apparatus and method for generating 3-dimensional image enable to perform photographing by adjusting photographing location, rotation velocity, and the like precisely even if an object to be photographed is rotating.

It is also still another object of the present invention to provide an apparatus and method for generating 3-dimensional image enable to perform an appropriate photographing by automatically detecting information about a photographic object (for example, size, width, shape, etc.) without additional input.

It is also still another object of the present invention to provide an apparatus and method for generating 3-dimensional image enable to create a 3D image promptly by photographing a plurality of images of an object simultaneously at different angles.

It is further another object of the present invention to provide an apparatus and method for generating 3-dimensional image equipped with the camera moving apparatus to support camera more stably and simultaneously to operate precisely.

To achieve aforementioned objects, according to the one aspect of the present invention, there is provided.

Technical Solution

The present invention provide a method for generating 3-dimensional image, in the method to photograph a photographic object in order to generate 3-dimensional images thereof by using an image photographing part comprising a camera part, a turn table part, a photographing angle adjustment part, a X-axis adjustment part and a Y-axis adjustment part and an image management device in which the camera part is joined with said photographing angle adjustment part, said x-axis adjustment part and said y-axis adjustment part and said photographic object is placed on the top of said turn table part, comprising the following steps:

(a) transmitting movement control signals from the image management device to a image-photographing part, where said movement control signals comprises camera location control signal, photographing angle control signal and turn table control signal;

(b) that said turn table part stands by in the state of rotating at a fixed speed corresponding to said movement control signal or rotating at a rotation angle corresponding to said movement control signal;

(c) that said Y-axis adjustment part adjusts the height of said camera part corresponding to said movement control signal;

(d) that said X axis adjustment part adjusts proximate position of said camera part corresponding to said movement control signal, where said proximate position is a distance between said camera part and said photographic object;

(e) that said photographing angle adjustment part adjusts a photographing angle of the camera part corresponding to said movement control signal, wherein said photographing angle is an angle that makes the internal central points of said camera part and said photographic object form a straight line;

(f) generating digital image by photographing a photographic object at said height, said proximate position and said photographing angle adjusted;

(g) transmitting said digital image generated to the image management device; and (h) repeating from said step (a) to said step (g) until all the digital images are generated in order to generate 3-dimensional image corresponding to said photographic object. The present invention further provides a system enable to perform the method for generating 3-dimensional image and still further a recoding medium. At this time, the movement control signal is updated whenever said digital image is generated.

Further, the present invention enables to produce a plurality of images separated corresponding to each object after photographed images of plural objects are obtained at a time by using a plurality of turn table parts which is different from the conventional technology which provides one image at a time.

The method for generating 3 dimensional image may further comprise the steps that the image management device stores the digital image and creating 3-dimensional images by using stored plural digital images.

In this, the digital images is stored corresponding to rotation speed or rotation angle information of the turn table part and height and proximate position information of the camera part and the 3-dimensional image can be created by using rotation speed or rotation angle information of the turn table part and height and proximate position information of the camera part.

The method for generating 3-dimensional image according to the present invention may further comprise the steps that the image management device displays the 3-dimensional images in a display part; receiving a display status changing command of the 3 dimensional image, where the display status changing command is chosen from expansion, reduction and rotation; and displaying 3-dimensional image whose display status is changed corresponding to the display status changing command in the display part.

In this case, the steps from step (a) to step (g) can be taken simultaneously.

Further, in the method for generating 3-dimensional image of the present invention, while the turn table part rotates at a fixed speed, the camera part photographs digital images corresponding to all angles of a photographic object at a first height and then, the camera part photographs digital images corresponding to all angles of the photographic object at a second height In the method for generating 3-dimensional image of the present invention, while the turn table part stands by with rotating at a first rotating angle, digital images corresponding to all sides of a photographic object are photographed and then, while said turn table part stands by with rotating at a second rotating angle, digital images corresponding to all sides of the photographic object are photographed.

In this, the 3-dimensional image may be a single compressed file form and the image management device may include computer, mobile communication terminal, personal digital assistant (PDA), and the like.

Further, in the method for generating 3-dimensional image of the present invention the size of the photographic object is determined in accordance with detection signals of the sensor attached to the camera part.

According to one aspect of the present invention, the present invention provides a system for generating 3 dimensional image, that comprises:

an image photographing part comprising a camera part, a turn table part arranged a certain distance apart from the camera part, a photographing angle adjustment part enable to rotate the camera part vertically, a X-axis adjustment part enable to move the camera part forward or backward (horizontally) against said turn table part, and Y-axis adjustment part enable to move the camera part vertically against said turn table part device, in which the camera part is joined with said photographing angle adjustment part, said x-axis adjustment part and said y-axis adjustment part and said photographic object is placed on the top of said turn table part;

an image photographing control part that generates a movement control signal, transmits to an image photographing part, and receives plural digital images photographed by the camera part, wherein movement control signal includes camera location control signal, photographing angle control signal and turn table control signal;

a 3 dimensional image creating part that generates 3-dimensional images by using the plural digital images; and a storage part that stores the plural digital images and 3-dimensional images.

At this time, as the turn table part stands by in the state with rotating at a fixed speed or at a rotation angle corresponding to the movement control signal, the Y-axis adjustment part, X-axis adjustment part, and photographing angle adjustment part adjusts height, proximate position and photographing angle of the camera part, and the camera part at the adjusted height, proximate position and photographing angle photographs a photographic object and then, transmits the created digital images to the image photographing control part.

Here, the X-axis adjustment part and Y-axis adjustment part may comprise a guide rail, a supporter fitted with the guide rail and moving along it, a cylinder fitted with the support, and a piston fitted with the cylinder and fixed with the camera part at one end thereof.

The X-axis adjustment part and Y-axis adjustment part may further comprise a multiple joint robot fixed with the camera part at one end thereof.

The X-axis adjustment part and Y-axis adjustment part may further comprise a guide rail, a supporter fitted with the guide rail and moving along it, a pair of screws arranged in a row with the supporter and enable to rotate by a driving means, a pair of sliders inserted into the screw and moving in an opposite direction each other of the rotation direction of the screw, a link jointed with each hinge at one ends of the pair of sliders, and a camera supporting plate jointed with each hinge of the other ends of the link.

The present invention provides a device for generating 3-dimensional image where it is joined with an image management device and photographs an object in order to create 3 dimensional image, comprising:

a turn table drive part that rotates a turn table supporting a photographic object at a fixed speed or at a rotating angle corresponding to the movement control signal received from the image management device;

a camera part that photographs the photographic object, generates digital image, and transmits the generated digital images to said image management device;

a Y-axis adjustment part that adjusts height of said camera part corresponding to said movement control signal;

an X-axis adjustment part that adjusts proximate position of said camera part corresponding to said movement control signal, where the proximate position a distance between said camera part and said photographic object; and a photographing angle adjustment part that adjusts a photographing angle of said camera part corresponding to said movement control signal, where the photographing angle is an angle that makes the internal central points of said camera part and said photographic object form a straight line, wherein said camera part is joined with said photographing angle adjustment part, said X-axis adjustment part and said Y-axis adjustment part, and said movement control signal is updated whenever said digital image is generated.

EMBODIMENTS

Hereinafter, the preferred embodiments of the present invention will be described with accompanying drawings.

Figure 1:
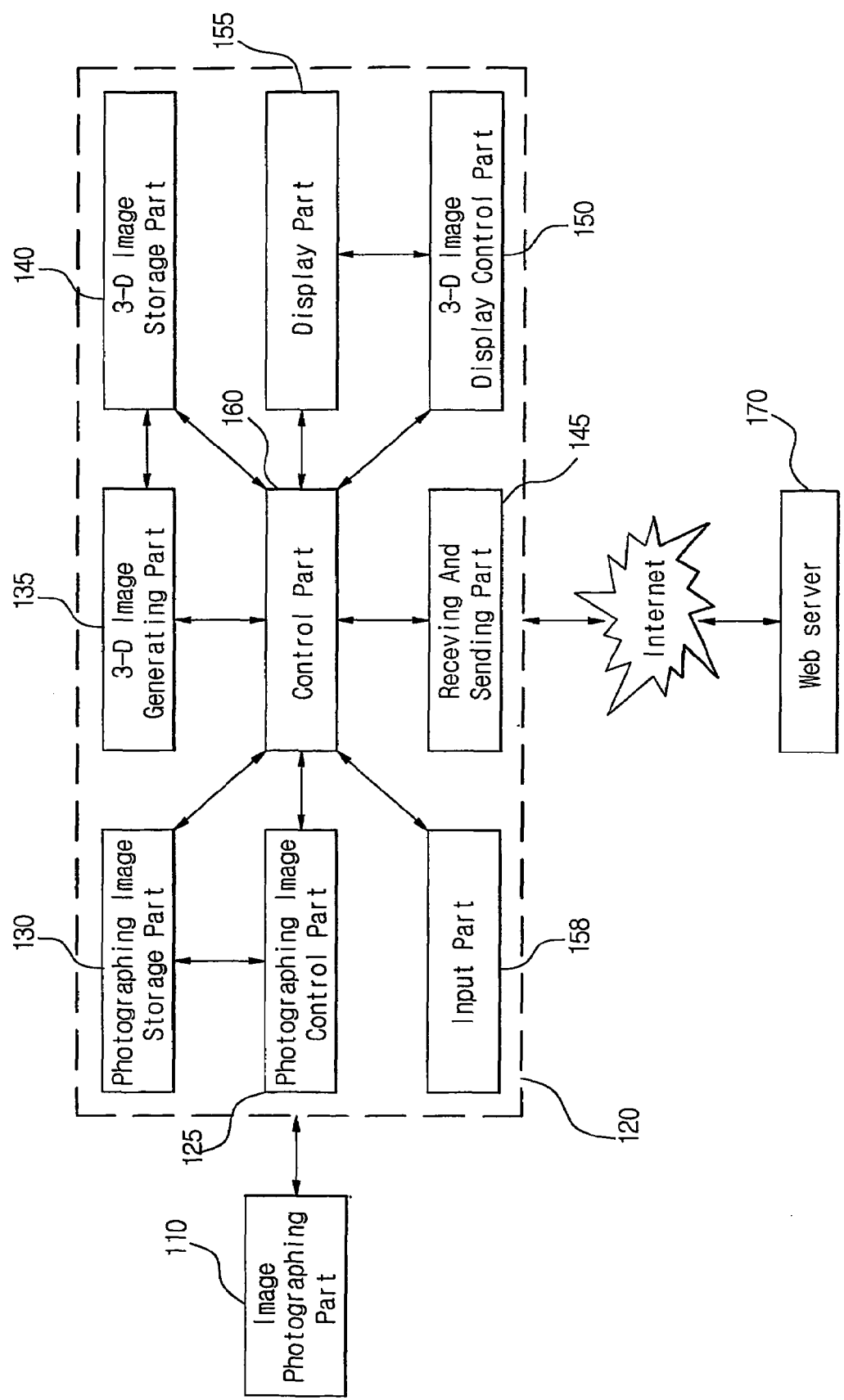
FIG. 1 is a block diagram representing the total system for performing 3-dimensional image generating method according to one preferred embodiment of the present invention.

FIG. 1 is a block diagram representing the total system for performing 3-dimensional image generating method according to the preferred embodiment of the present invention.

Referring to FIG. 1, the device for creating 3-dimensional image of the present invention includes an image photographing part 110 and an image management part 120.

The image photographing part 110 photographs a photographic object corresponding to control signals of the image management device 120 such as camera location control signal, photographing angle control signal, rotation speed control signal of the turn table, and rotation angle control signal of the turn table, and performs the function of transmitting photographed digital images (for example, images in JPEG format) to the image management part 120. The detailed composition of the image photographing part 110 will be described in detail with referring to FIG. 2.

The image management part 120 comprises an image photographing control part 125, a photographing image storage part 130, a 3-dimensional image creation part 135, a 3-dimensional image storage part 140, a transmitting and receiving part 145, a 3-dimensional image display control part 150, display part 155, an input part 158, and a control part 160.

The image photographing control part 125 performs the function of creating control signals to control the status of the image photographing part 110 such as camera location control signal, photographing angle control signal, rotation speed control signal of the turn table, and rotation angle control signal of the turn table, and then transmitting them to the image photographing part 110. In addition, the image photographing control part 125 performs the function of receiving photographing images transmitted from the image photographing part 110, which are photographed images at a location and a camera angle corresponding to the control signals, and storing them in the photographing image storage part 130 by controls of the control part 160. The digital image, that is photographed by the image photographing part 110 based on control signals created from the image photographing control part 125, is the most appropriate size for user's demand. In addition, the image photographing control part 125 can perform the functions of changing a file format of digital images photographed by the image photographing part 110 (for example, conversion from JPEG format to BMP format) and of merging different, multiple files (for example, multiple files consisting of JPEG format, BMP format, and MPEG format) into one file. Even though it is not shown in FIG. 1, the transmitting and receiving part may be further included that transmits data communications between the image photographing control part 125 and the image photographing part 110.

The photographing image storage part 130 stores plural digital images photographed by the image photographing part 110 corresponding to control signals from the image photographing control part 130. The photographing image storage part 130 may further store photographing status information that corresponds to each digital image such as coordinates x and coordinates y in terms of photographing location, and rotation angle of the turn table at the time of photographing, and information on photographing side of a photographic object.

The 3-dimensional image creation part 135 processes plural digital images stored in the photographing image storage part 130 to create an electronic file. And instead of creating an actual 3-dimensional image, a method of connecting plural 3-dimensional images and making them look like a moving image can be adopted so that users can recognize it as a 3-dimensional image. Said electronic file is a compressed file that can be compressed to smaller than one-hundredth of its original size. It can be recognized as a moving image by processing and modifying plural digital images. Thus, some works such as modifying the background and central axis of digital images stored in the photographing image storage part 130 (for example, adjusting the central axis) and expanding plural digital images to a multi image may be required prior to creating said electronic file.

The 3-dimensional image storage part 140 performs the function of storing said electronic file created by the 3-dimensional image creation part 135. And the photographing image storage part 130 and the 3 dimensional image storage part 140 can be integrated as one storage part.

The transmitting and receiving part 145 performs the functions of transmitting said electronic file stored in the 3 dimensional image storage part 140 to an external web server 170 (for example, an server of electronic commerce, etc.) and of receiving requests from the external web server 170.

The 3-dimensional image display control part 150 performs the functions of displaying said electronic file created in 3-dimensional form in the display part 155 and of converting and displaying the images in the display part 155 corresponding to user's commands (for example, rotation of the image from side to side, expansion, reduction, etc.).

The display part 155 is the means of displaying 3-dimensional images, and the input part 158 is the means of being inputted of the size of the photographic object, etc. by a display control command or a user. In FIG. 1, it illustrates only the case that 3-dimensional images are displayed through the display part included in the image management device 120. However, it is naturally possible that 3-dimensional images can be displayed through a display device combined the image management device 120 with a separate display device.

The control part 160 performs the function of controlling the image photographing control part 125, the photographing image storage part 130, the 3 dimensional image creation part 135, the 3 dimensional image storage part 140, the receiving and sending part 145, and the 3-dimensional image display control part 150 in order to create and provide 3-dimensional images automatically.

It should be noted that the composition of the 3-dimensional image creation device illustrated in FIG. 1 is just one embodiment used to explain the invention, and that some components included in FIG. 1 (for example, display part, input part, etc.) can be omitted or joined with external devices (for example, computer, etc.) to perform the same function as explained in the above. In addition, the image management device according to the present invention can be implemented as software that is installed and operated in a computer, without having any a separate hardware component.

Figure 2:
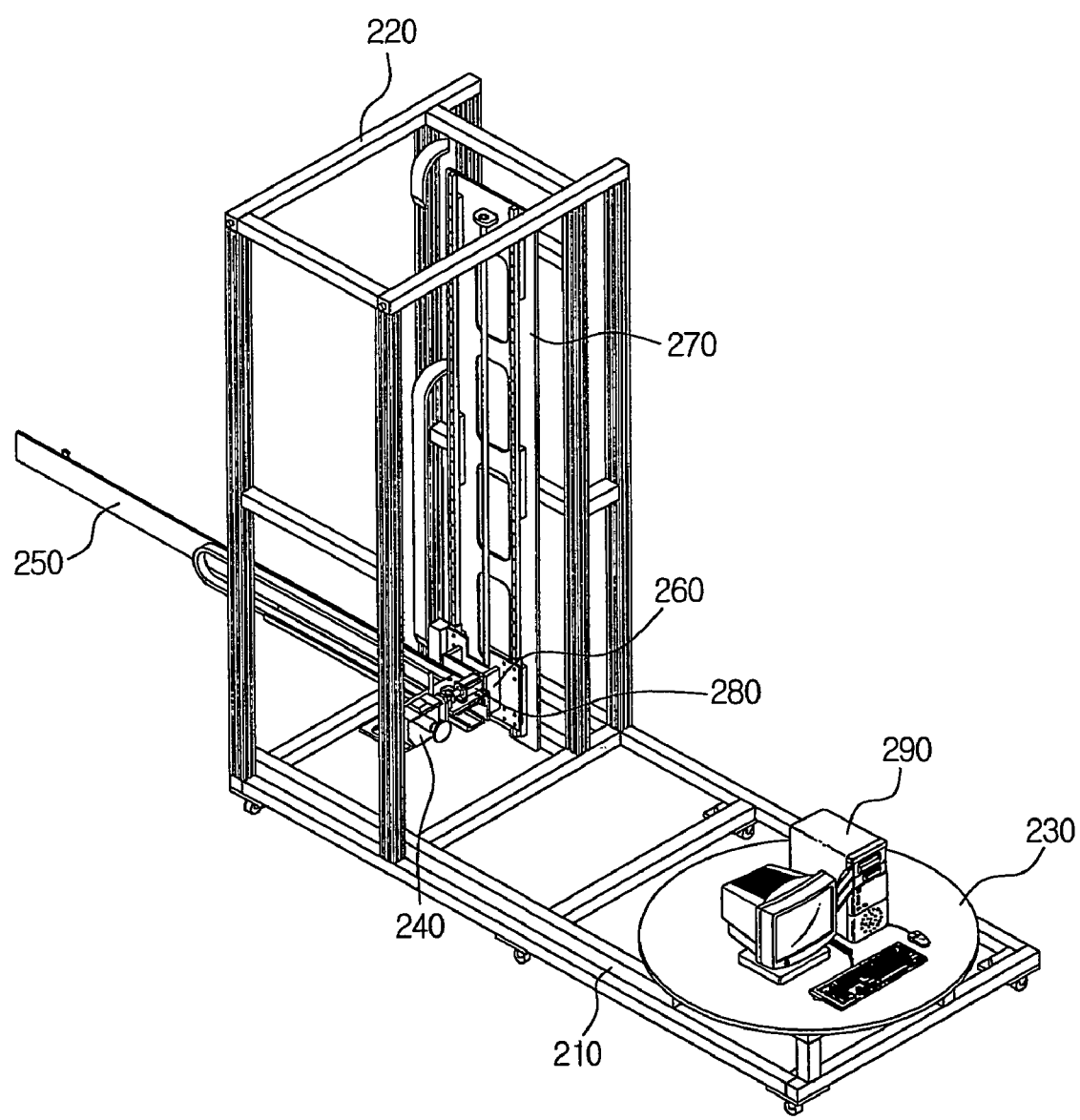
FIG. 2 is a perspective view illustrating detailed composition of the image photographing part according to one preferred embodiment of the present invention.
Figure 3:
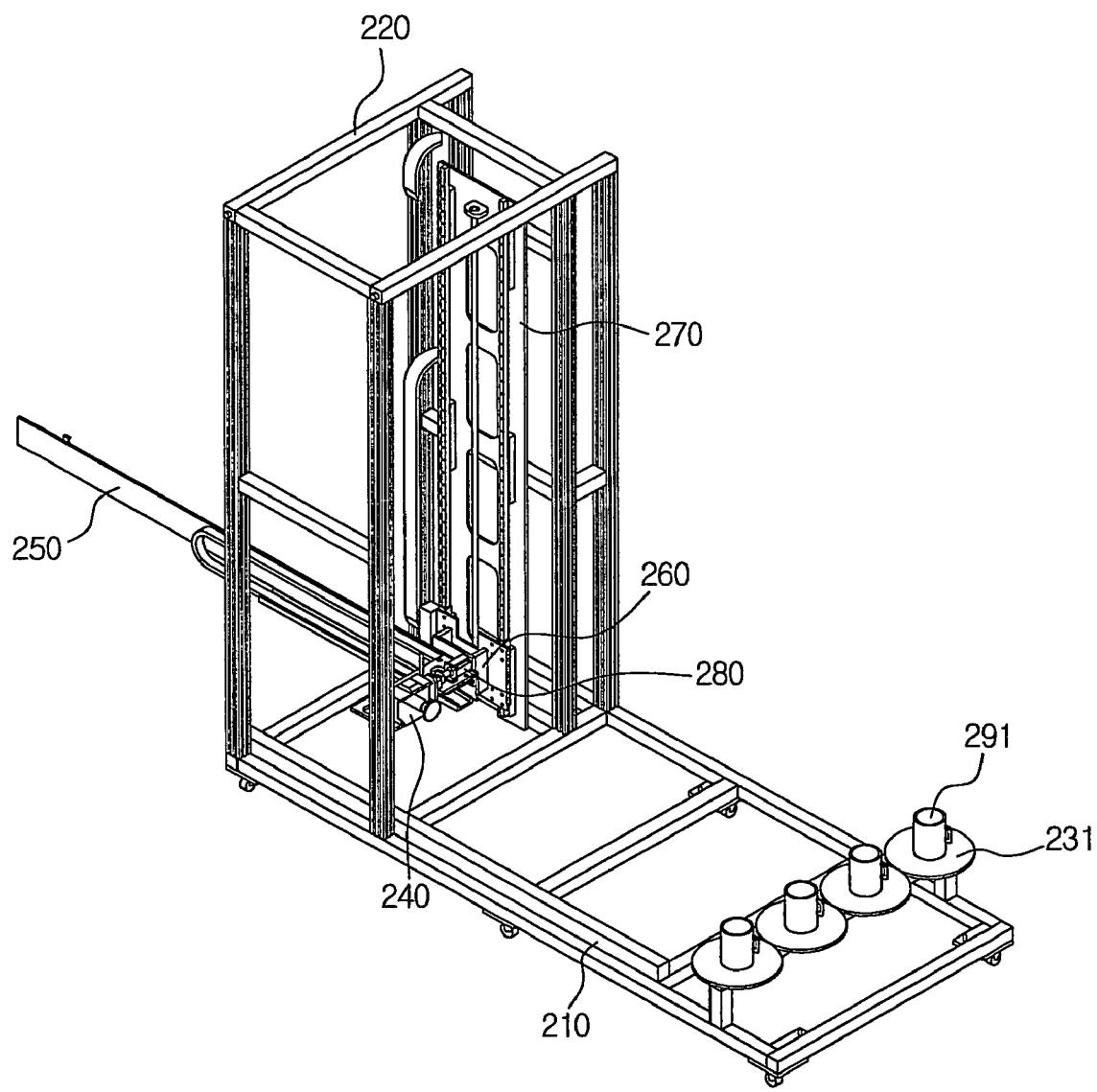
FIG. 3 is a perspective view illustrating detailed composition of the image photographing part according to another preferred embodiment of the present invention.
Figure 4:
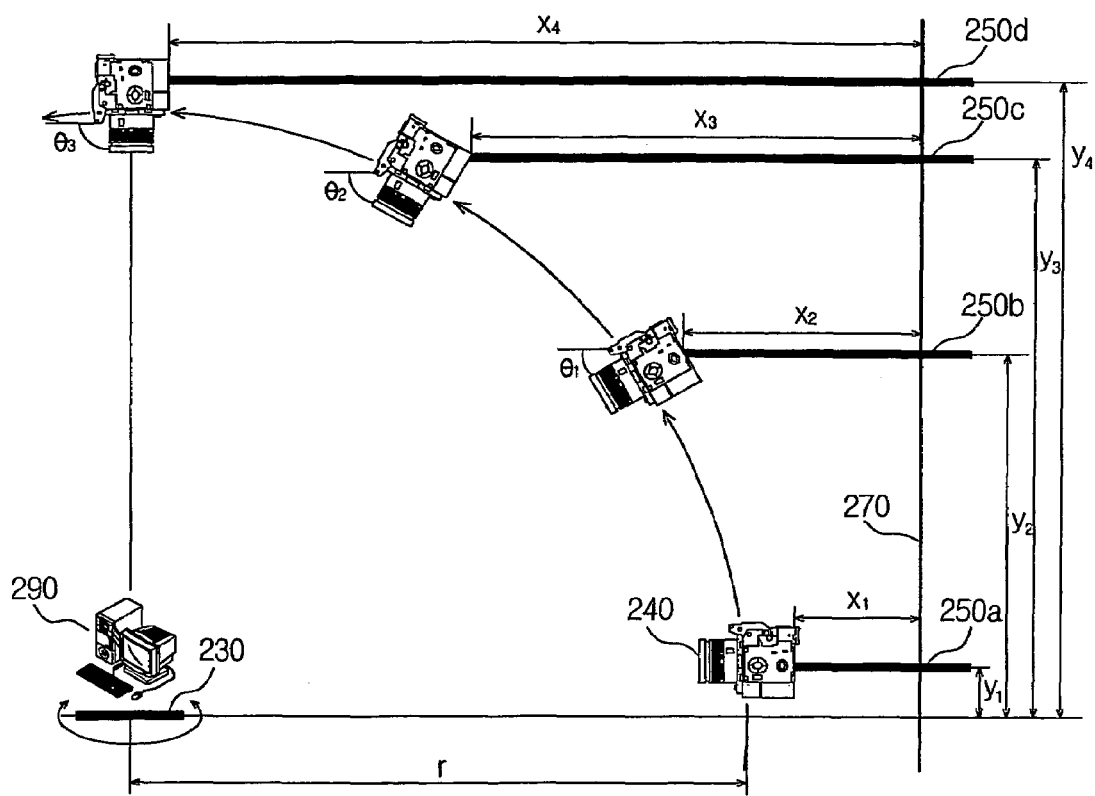
FIG. 4 is a side view illustrating photographing state of the image photographing part according to one preferred embodiment of the present invention.
Figure 5:
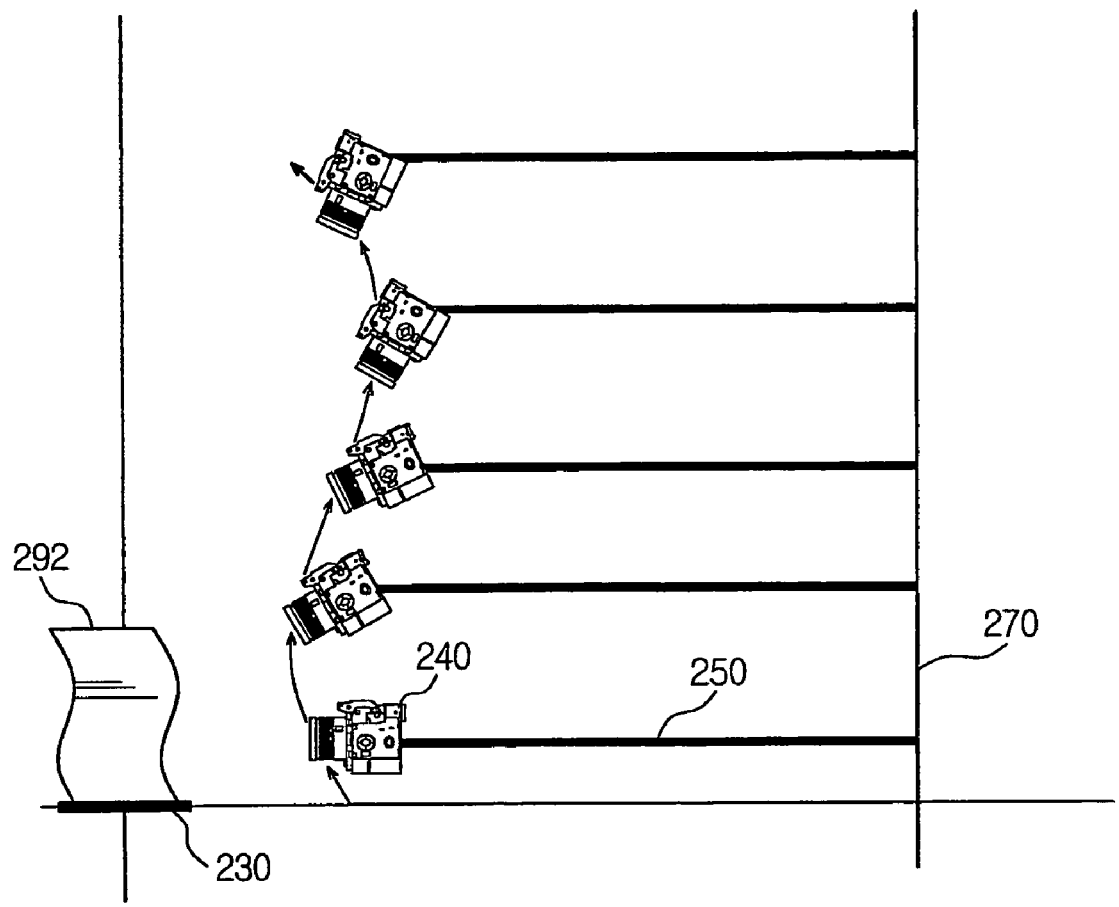
FIG. 5 is a side view illustrating photographing state of the image photographing part according to another preferred embodiment of the present invention.

FIG. 2 is a perspective view illustrating detailed composition of the image photographing part according to one preferred embodiment of the present invention and FIG. 3 is another preferred embodiment. FIG. 4 is a side view illustrating photographing state of the image photographing part according to one preferred embodiment of the present invention and FIG. 5 is another preferred embodiment.

Referring FIG. 2, the image photographing part 110 has a frame 200 to support the device, wherein the frame comprises a horizontal frame 210 to mount a turn table part and a vertical frame 220 mounted vertically to one end of the horizontal frame. Each frame 210, 220 comprises beams with a square section, and each beam can be made of iron materials, or plastic resins.

Meanwhile, the turn table part 230 is mounted around one end of the horizontal frame 210. The turn table part 230 comprises a circular plate and a driving means for its rotation, and the driving means may be chosen from an electric motor and a hydraulic and pneumatic motor.

The vertical frame 220 has an x axis adjustment part and a y axis adjustment part loaded on it in order to move the camera part 240 horizontally and vertically, that is to say, in the directions of x axis and y axis. The x axis adjustment part is composed of a bar 250 to one end of which the camera part 240 is loaded, a driving means used to move the bar 250 forward or backward, which is not illustrated in FIG. 2, and a supporter 260 that guides the movement of the bar 250 not to move out of the way.

The driving means can be composed of a roller and a motor rotating while it is in contact with the back of the bar 250. Thus, as the motor rotates, a friction caused between the roller and the bar 250 makes the bar move forward or backward, which, in turn, makes it possible to change the distance on a horizontal axis between the camera part 240 and the turn table part 230. On the other hand, the supporter 260 is inserted on a guide rail 270 that is installed vertically on the vertical frame, and moves vertically by a separate driving means on the guide rail 270, thus makes it possible to change the height of the camera part 240 and the turn table part 230.

As explained already, the camera part 240 is mounted at one end of the bar 250 and a photographing angle adjustment part 280 is installed between the camera and the bar 250 in order to adjust a photographing angle. The photographing angle adjustment part 280 can be a motor installed at one end of the bar, where the motor rotates in a way that the camera part 240 can have an appropriate angle against the photographic object 290.

The camera part 240 performs the function of photographing images of the photographic object 290, generates digital images and transmitting the generated image to the image management device 120 while the photographing angle adjustment part 280, the Y axis adjustment part and the X axis adjustment part execute their functions corresponding to control signals received from the image photographing control part 125. The camera part 240 can be connected through a cable to receive control signals from the image photographing control part 125 and to transmit photographed images to the image photographing control part 125.

Turn table part 230 rotates its turn table with the photographic object 290 on it to a pre-assigned direction and with a rotation speed or rotation angle corresponding to control signals received from the image photographing control part 125. The turn table part 230 can be connected with the image photographing control part 125 through a cable to receive control signals from the image photographing control part 125.

At the lower part of the turn table part 230 can be equipped a rotating means (for example, a motor) used to rotate the turn table corresponding to the received control signals, an adjustment means (for example, a motor) used to adjust the height of the turn table part 230 and the like.

The photographing angle adjustment part 280 performs the function of adjusting a photographing angle of the lens of the camera part 240 corresponding to control signals received from the image photographing control part 125. And it can be connected with the image photographing control part 125 through a cable to receive control signals from the image photographing control part 125, and can include a rotating means (for example, a motor) to rotate the camera part 240 for the adjustment of the angle of the lens.

The Y axis adjustment part 270 performs the function of adjusting the height of the camera part 240 corresponding to control signals received from the image photographing control part 125. And it can be connected with the image photographing control part 125 through a cable to receive control signals from the image photographing control part 125, and can include a rotating means (for example, a motor) to move the camera part 240 and the photographing angle adjustment part 280 upward or downward.

The x axis adjustment part 250 performs the function of moving the position of the camera part 240 in the direction toward the photographic object 290 (hereinafter referred to as "forward") or in the opposite direction (hereinafter referred to as "backward") corresponding to control signals received from the image photographing control part 125. And it can be connected with the image photographing control part 125 through a cable to receive control signals from the image photographing control part 125, and it can include a rotating means (for example, a motor) to move the camera part 240 and the photographing angle adjustment part 280 forward or backward.

Referring to FIG. 3, the turn table part 231 is arranged in a row so that the size of each image photographed will be the same. If the distance between each turn table part and camera is close, there can be a difference in size of images at turn table parts located at both ends and located at the center. In this case, there can be a need to make the distance equal by arranging them in a circular arc with the camera being the center. In many case, however, the difference in size is insignificant.

With referring to FIG. 4, the following is a brief explanation about the photographing status of the photographic object 290 by the image photographing part 110. In order to get 3-dimensional images of the photographic object 290 does the turn table part 230 rotate, and the camera part 240 photographs many times at moved states to pre-determined locations.

Referring to FIG. 4, the camera part 240 of the image photographing part 110 photographs the first image at a base location (that is, coordinates($x_1$, $y_1$)) and at a base photographing angle (that is, θ=0). The base location can be a location changed in order to get an optimum image that the consumer wants by considering the size of the photographic object 290, and the base photographing angle is established based on the internal central point of the photographic object 290.

Then, the camera part 240 of the image photographing part 110 photographs the second image at a first location (coordinates($x_2$, $y_2$)) and a first photographing angle (that is, θ=$θ_1$). At this time, the photographing angle is one changed to correspond to the internal central point of the photographic object 290.

Then, the camera part 240 of the image photographing part 110 photographs the third image at a second location (coordinates($x_3$, $y_3$)) and at a second photographing angle (that is, θ=$θ_2$), and finally it photographs the fourth image at a third location (coordinates($x_4$, $y_4$)) and a third photographing angle (that is, θ=$θ_3$).

When photographing the fourth image, the camera part 240 is located at vertically upward position from the photographic object 290 and thus, the third photographing angle is a phase angle of 90.

Accordingly, the image photographing part 110 takes pictures at a location and at an angle predetermined corresponding to control signals received from the image photographing control part 125, and the smaller the size of the photographic object 290 is, the closer distance of (r) between the photographic object 290 and the camera part 240 becomes, meaning that the X axis adjustment part 250 makes the camera part 240 more exposed forward.

In addition, since the Y axis adjustment part 270 and X axis adjustment part 250 can execute their functions at the same time as the camera part 240 moves to each photographing location, the camera part may be seen as moving diagonally in some cases. And as the camera part 240 moves to each photographing location, the photographing angle adjustment part 280 automatically adjusts the photographing angle of the camera part 240.

In addition, even though FIG. 2 and FIG. 3 illustrate the camera part 240 only horizontally photographs photographic objects 290, 291, the camera part 240 can perform the function of changing the status (for example, vertical photographing status or horizontal photographing status) corresponding to control signals received from the image photographing control part 125.

And as illustrated in FIG. 5, the photographing location (that is, coordinates x, y) of the camera part 240 can have various types of moving in addition to circumference-based moving, according to the form of the photographic object 292. That is to say, once the form of the photographic object 292 is recognized, the image photographing part 110 can have various photographing routes based on controls from the image photographing control part 125.

Figure 6:
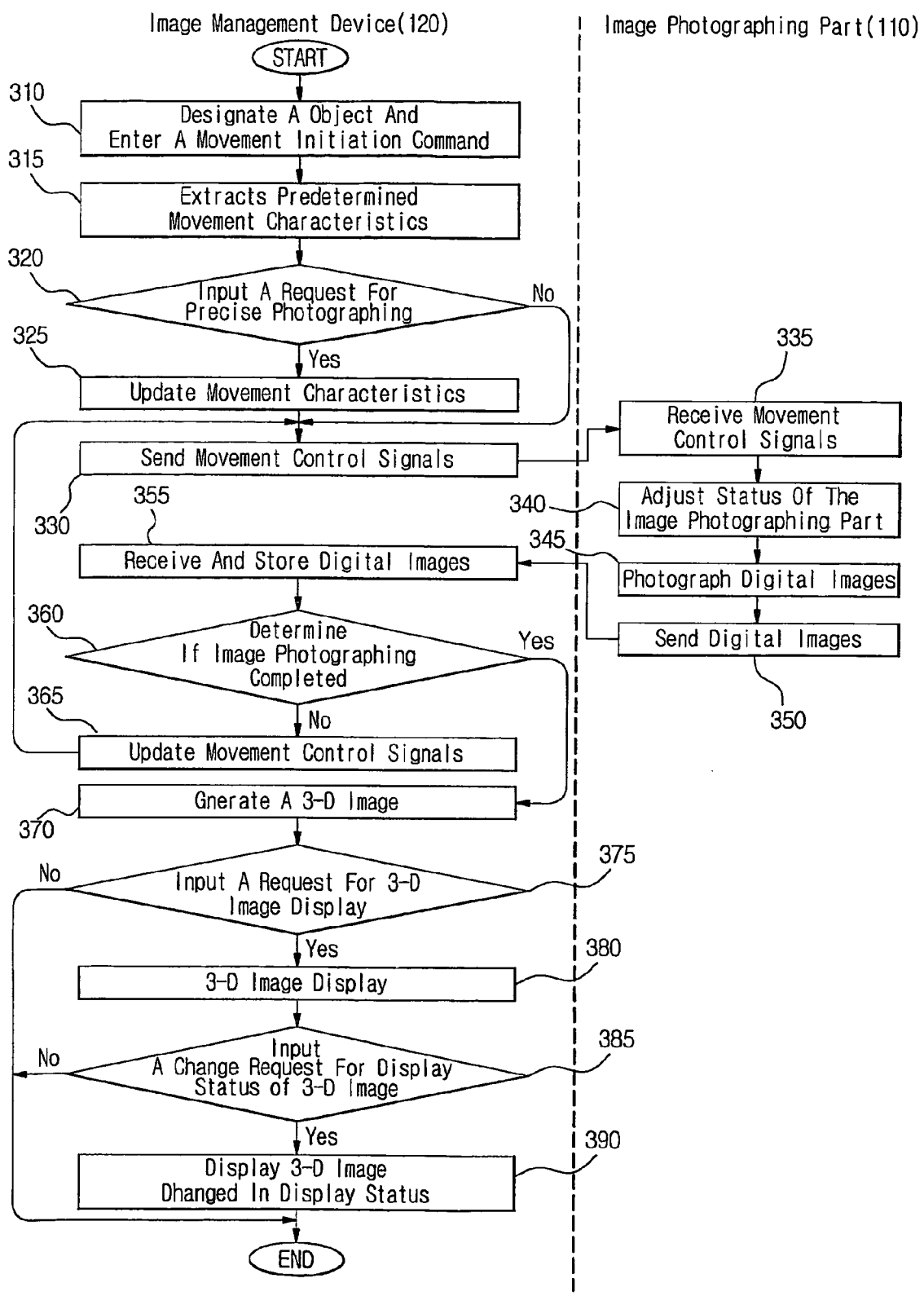
FIG. 6 is a flow chart illustrating a method for generating 3-dimensional image according to one preferred embodiment of the present invention.
Figure 7:
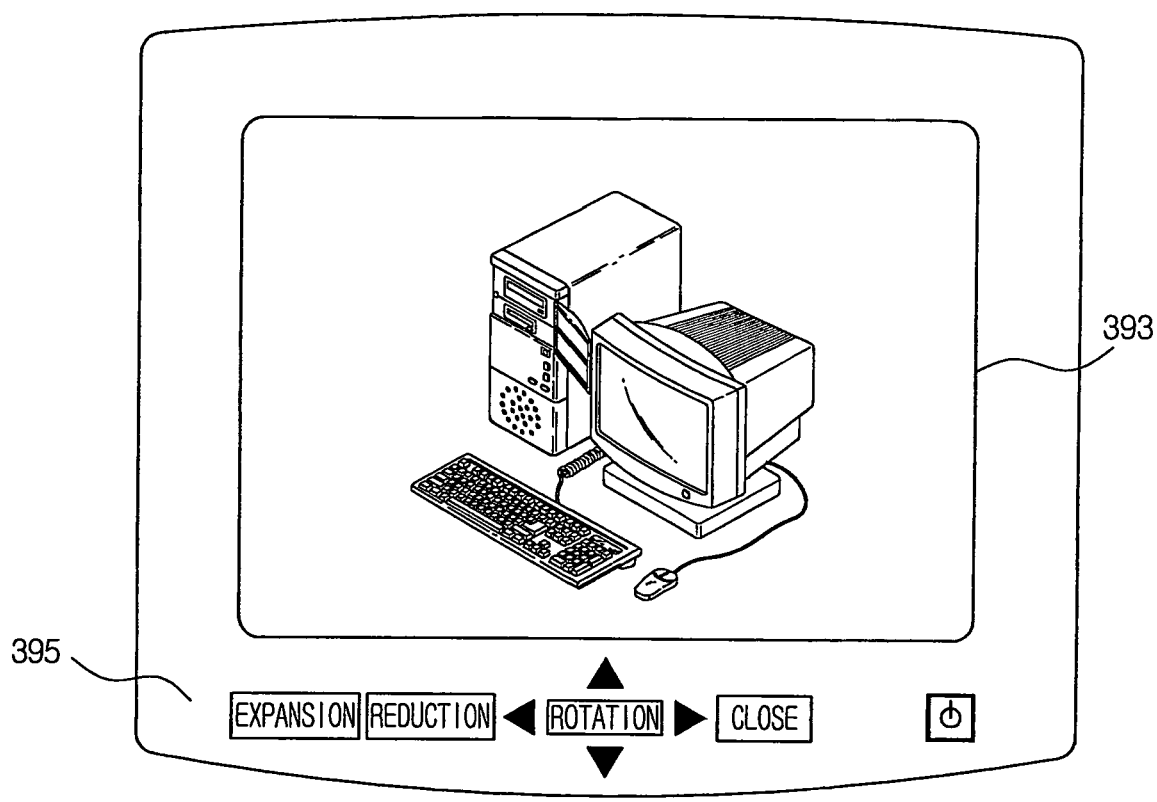
FIG. 7 is a front view illustrating an example of the display form of 3-dimensional image according to one preferred embodiment of the present invention.

FIG. 6 is a flow chart illustrating a method for generating 3-dimensional image according to one preferred embodiment of the present invention and FIG. 7 is a front view illustrating an example of display form of 3-dimensional image according to one preferred embodiment of the present invention.

Referring to FIG. 3, at step 310, the image management device 120 of the 3-dimensional image creation device receives commands for designating a photographic object and starting operation from a consumer who wants to create 3-dimensional images for a specific photographing object 290. Example of the photographic object include products for sale, face images for cosmetics surgery, and artistic works of sculpture. In this case, the face image for cosmetic surgery may require a higher level of precision than products for sale may, leading to photograph plural images of a face from more various angles.

At step 315, the image management device 120 extracts predetermined movement characteristics (for example, image photographing angle, number of photographing, etc.) corresponding to the designated photographic object through step 310. For example, in case of products for sale, image photographing angles can be predetermined to photograph the product at angles of horizontal plane, vertical plane, and an angle of 45 from the product. And in case of face images for cosmetic surgery, image photographing angles can be predetermined to photograph the product at angles of horizontal plane, vertical plane, and every angle of 10 from the face. In addition, camera's photographing proximate position can be predetermined according to the size of the photographic object.

At step 320, the image management device 120 determines if there is a request for precise photographing from a manager. Request for precise photographing refers to the request for more number of photographing. For example, while the predetermined movement characteristics photographs at 4 different angles as shown in FIG. 4, a request for precise photographing is for more photographing at more different angles.

When a request for precise photographing is inputted, at step 325, the image management device 120 updates movement characteristics (for example, angle of image photographing and number of photographing) extracted through step 315 and proceeds to step 330. But when there is inputted no request for precise photographing, it proceeds immediately step 330.

At step 330, the image management device 120 transmits to the image photographing part 110 movement control signals such as camera location control signal, photographing angle control signal, turn table's rotation speed control signal, and turn table's rotation angle control signal.

At step 335, the image photographing part 110 receives movement control signals from the image management device 120, and proceeds step 340 to adjust its status corresponding to movement control signals received. For example, according to movement control signals, the image photographing part 110 can move height and location of the camera part 240, and can stand by with rotation at a rotation speed of the turn table part 230 or a certain angle. In this step, position or situation can be re-adjusted or automatic start for photographing can be performed depends on the status of initially photographed images.

At step 345, the image photographing part 110 photographs digital images after an adjustment is made through step 340 and proceeds to step 350 to transmit digital images photographed to the image management device 120.

When the image photographing part 110 takes pictures of the photographic object 290, a photographing angle of the camera part 240 is adjusted to one that makes the internal central points of the camera part and the photographic object form a straight line.

At step 355, the image management device 120 receives digital images from the image photographing part 110 and stores them. In case that the digital images include plural photographic objects, they are divided and stored by each object. Then, the image management device 120 determines whether or not image photographing has been completed for the photographic object 290 at step 360. If it is not completed, the step 365 is proceeded to update movement control signals and then step 330 is again proceeded. On the other hand, if it is completed, it directly moves to step 370.

Through steps from step 330 to step 365, the image photographing part 110 is able to photograph the photographic object from the angles and locations wanted, and as the turn table part 230 rotates, it can photograph the photographic object 290 from all sides (for example, front side and back side). In addition, a method for photographing the photographic object 290 at 360 is chosen from a method that after photographing all including horizontally, diagonally, and vertically of one side of the photographic object 290, the turn table part 230 is rotated to a certain angle and all of one side thereof is photographed, and a method that after all the photographing is completed at an angle by rotating the turn table part 230, the camera part 240 is moved to a different angle to do all the photographing from that angle by rotating the turn table.

At step 370, the image management device 120 creates a 3-dimensional image by using plural digital images photographed. A method for merging and compressing many kinds of files into an image can be applied. In addition to this, a method can be applied for connecting plural digital images to look like a 3 dimensional image to the eyes of consumer instead of actually creating one 3-dimensional image.

A process of merging image for the creation of one 3-dimensional image comprises: a step of correcting photographed image data; a step of entering corrected image data; a step of dividing into two areas of which one is an area where the photographic object exists and the other is a background area from digital images entered and then eliminating the background area; a step of according central points of only digital images with the photographic object with one another; a step of adding a multi streaming function (for example, expansion, reduction, and animation, etc.) to constantly arranged data; a step of recording; and a step of compressing to an optimum capacity by applying MPEG technology at the same time with recording to each of digital images.

At step 375, the image management device 120 determines if there is a request for 3-dimensional image display from a manager. In case where there is a request for 3-dimensional image display, it proceeds to step 380 to display a 3-dimensional image to the display part 155. But when there is no request input, it closes the step.

In addition, at step 385, the image management device 120 determines if there is a change request for the display status of 3-dimensional image from a manager. In case where there is a change request input for display status, it proceeds to step 390 to display the 3-dimensional image whose display location has been changed at the display part 155. But when there is no request input, it closes the step.

FIG. 7 illustrates how 3 dimensional image is displayed at the display part 155. Referring to FIG. 7, 3-dimensional image display screen includes a 3 dimensional image display area 393 and a function button area 390. The function button area 395 can include an expansion button to expand and display 3-dimensional image displayed in the 3 dimensional image display area, a reduction button to reduce and display 3-dimensional image, rotation buttons to rotate and display 3-dimensional image (that is, downward and upward rotation, right and left rotation), and a close button to display other images. That is to say, the image management device 120 of the present invention enables to rotate the shape of the photographic object to a right, left, up and down direction according to the control of the mouse, and also enables to have an expansion or animation in the areas to which multi streaming is applied.

Even through it is not illustrated in FIG. 6, a step of transmitting 3-dimensional images created through step 370 to an external web server 170 through a communications network can be included.

Figure 8:
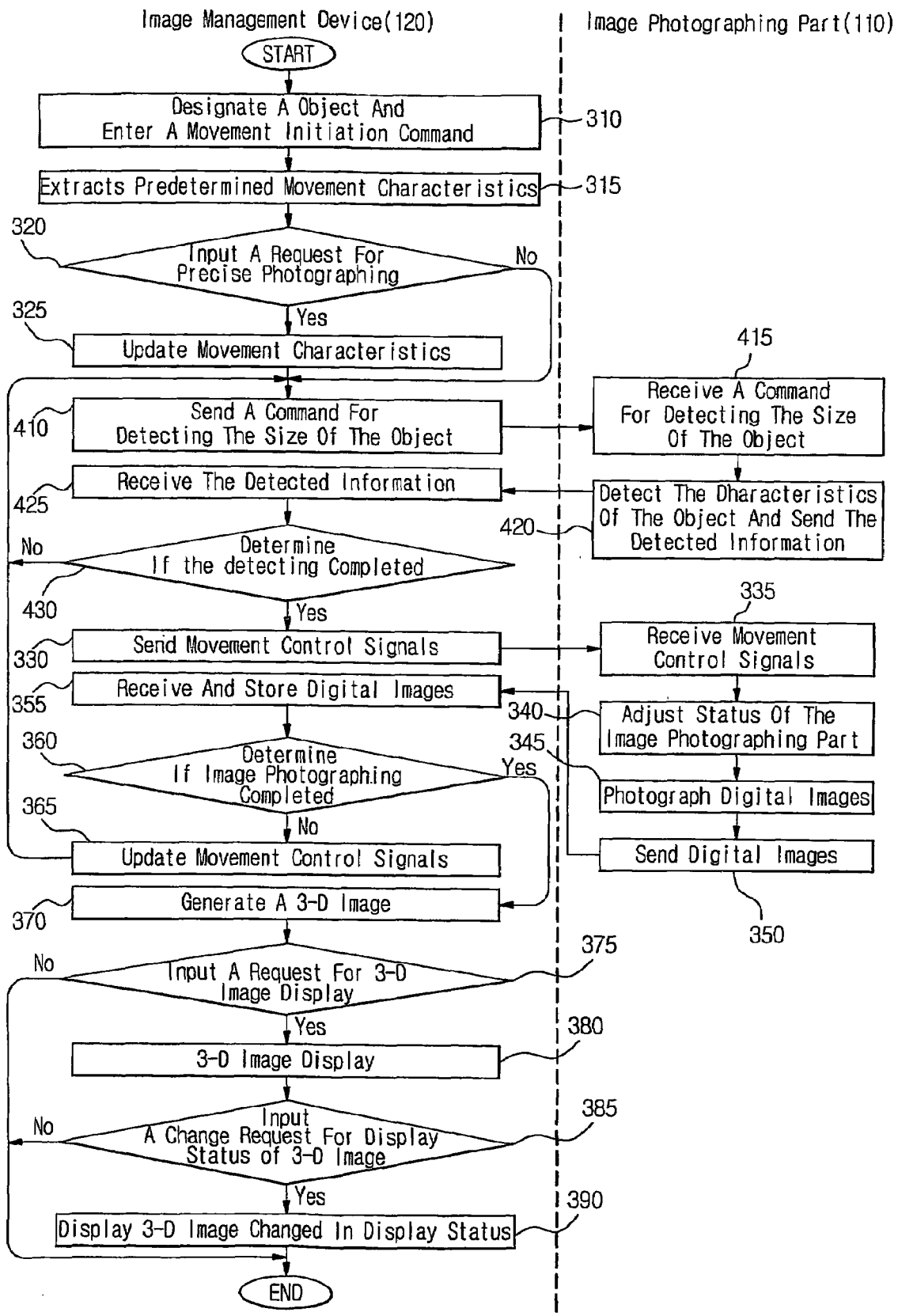
FIG. 8 is a flow chart illustrating a method for generating 3-dimensional image according to another preferred embodiment of the present invention.

FIG. 8 is a flow chart illustrating a method for generating 3-dimensional image according to another preferred embodiment of the present invention.

The method for creating 3-dimensional image illustrated in FIG. 8 is a method in which the 3 dimensional image creation device itself identifies the characteristics of the photographic object 290 (for example, size and type, etc.) to perform photographing of digital images without separate inputs of the characteristics of the photographic object 290. A method for generating 3-dimensional image illustrated in FIG. 8 will be omitted since it is repeated explanation in FIG. 6

Referring to FIG. 8, at step 410, the image management device 120 transmits to the image photographing part 110 a command for detecting the size of the photographic object.

At step 415, the image photographing part 110 receives the commands for detecting the size of the photographic object, and then proceeds to step 420 to detect the characteristics of the photographic object and transmits the detected information to the image management device 120.

At step 425, the image management device receives a detection signal about the photographic object 290 from the image photographing part 110, and determines whether or not the detection of character information (for example, size) about the photographic object 290 has been completed by proceeding step 430.

For example, the command for detecting the size of the photographic object can include a command for upward movement of the camera part 240 by the Y axis adjustment part and a control command for movement detected by the detector (for example, an infrared rays sensor) attached to the camera part 240. That is, once the command for detecting the size of the photographic object is received from the image management device 120, the Y axis adjustment part 270 slowly moves the camera part 240 upward from the base location (that is, the location of the bottom side of the turn table part 230), and in this process, the detector attached to the camera part 240 detects continuously whether or not the photographic object exists in front and then transmits signals detected to the image management device 120. At any point when the photographic object starts is not detected, the distance from the base location to the point mentioned is height of the photographic object, and be the distance between the location detected as the surface of the photographic object 290 and the central axis of the turn table part 230 is width of the photographic object 290. In this way, the rotation of the turn table part 230 makes it possible for the image photographing control part 125 to recognize the form, height and width of the photographic object 290.

If the detection of the characteristic information about the photographic object 290 has not been completed, it proceeds again to step 410, But, if it has been completed, it proceeds to step 330. The steps following step 330 are the same as explained in FIG. 6, so they will be omitted.

Figure 9:
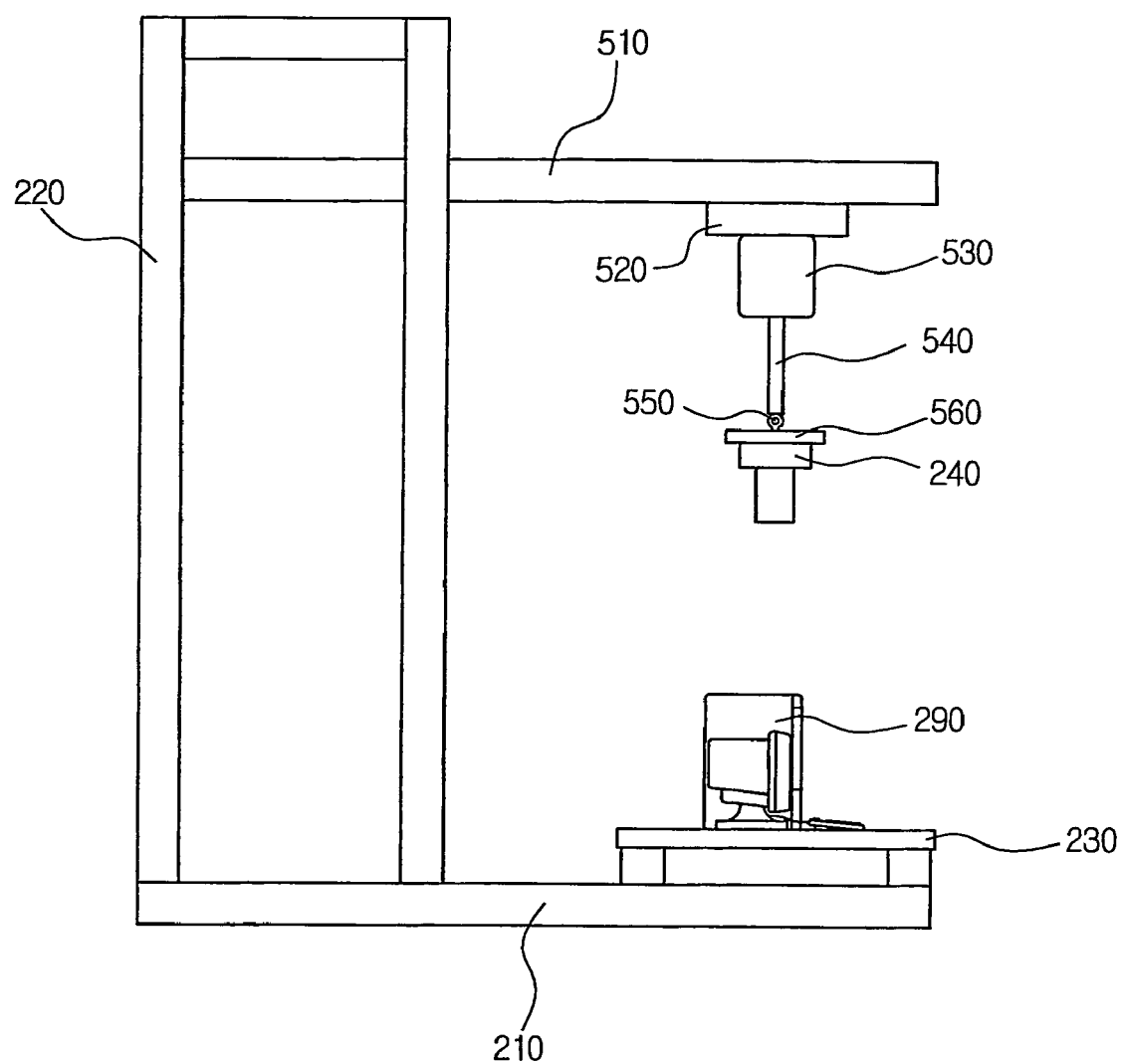
FIG. 9 is a side view illustrating the x-axis adjusting part and y-axis adjusting part according to another preferred embodiment of the present invention.

FIG. 9 is a side view illustrating the x-axis adjusting part and y-axis adjusting part according to another preferred embodiment of the present invention. Since an operation method for the embodiment illustrated in FIG. 9 is the same as the embodiment pre-explained, only composition of devices will be explained.

The embodiment illustrated in FIG. 9 has the same horizontal frame 210 and the vertical frame 210 as the embodiment illustrated in FIG. 2, and the turn table part installed at the front end of the horizontal frame is the same as well. Only difference is in the composition of the X axis adjustment part and the Y axis adjustment part. A guild rail 510 is installed around the upper part of the vertical frame in a parallel with the horizontal frame 220. The guide rail 510 extends to the upper part of the turn table part 230, and the supporter 520 is installed under the guide rail in a way that it can move to the left and right along the guide rail 510 by a driving means (not illustrated) in FIG. 9.

In addition, oil pressure cylinder or air pressure cylinder 530 is loaded onto the lower side of the supporter 520. And at the lower part of the piston rod 540 loaded onto the cylinder 530 is loaded the camera supporting plane 560 so that it can rotate to a left and right direction as illustrated in FIG. 9. Between the piston rod 540 and the camera supporting plane 560 is loaded the rotating angle adjustment device 550 that rotates the camera supporting plane 560, the rotating angle adjustment device 550 can use an electronic motor. A camera is loaded at the lower part of the camera supporting plane 560.

Thus, since the horizontal distance between the camera and the photographic object can be adjusted by moving the supporter 520, and the vertical distance between the camera and the photographic object can be adjusted by moving the piston rod 540 forward or backward from the cylinder, it can perform as the X axis and Y axis adjustment parts. In the embodiment illustrated in the FIG. 9, in particular, only the supporter 520 moves with the guide rail being fixed, thereby helping to enhance its structural stability. That makes it possible to not only have a more precise control but also get accurate photographing images.

Unlike the embodiment illustrated in FIG. 9, an embodiment can be considered in which the guide rail is arranged vertically, and the piston rod moves forward or backward in the horizontal direction.

Figure 10:
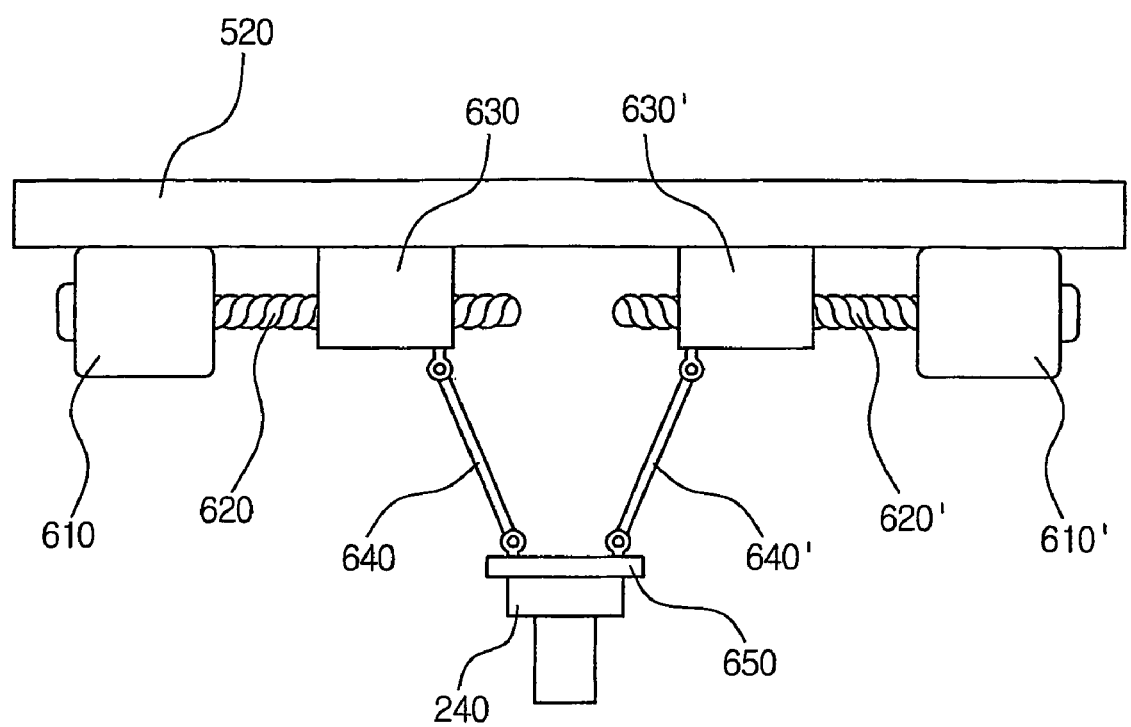
FIG. 10 is a side view illustrating x-axis adjusting part and y-axis adjusting part according to another preferred embodiment of the present invention.

In addition, a different embodiment can be considered in which other forms of devices are used instead of the cylinder and piston rod, which is illustrated in FIG. 10.

That is, the embodiment illustrated in FIG. 10 is the same as one illustrated in FIG. 9 in that it has horizontal and vertical frames, and a guide rail. However, the piston rod and cylinder are replaced by different types of devices. First, a pair of an electronic motors 610, 610' are mounted in a straight line at the bottom side of the supporter 520. And each rotating axe 620, 620' of the motors extends along the straight line, and on its surface is formed a screw thread. And each rotating axe is loaded with a slider 630, 630' with a hole in it into which the screw thread is fitted. Thus, the sliders move in opposite directions each other by the rotation of the motor.

At the time, the slider have to maintain its contact with the supporter 520 to prevent from rotation of the slider and the screw together. And it is advised to install a bearing on the side of the slider which comes in contact within the supporter in order to reduce contract resistance.

Meanwhile, a connection link 640, 640' is respectively joined by hinge at one end of each slider 630, 630', and the camera supporting plane 650 is joined by hinge at the other end of each connection link. Thus, by the rotation of the motor, the camera supporting plane 650 is able to move forward or backward from the supporter 520. In addition, a rotation angle adjustment part is installed between the camera supporting plane 650 and the camera 240 to adjust a rotation angle of the camera.

As was described in the embodiment illustrated in FIG. 9, it is possible to change the vertical and horizontal locations for installation in the embodiment illustrated in FIG. 10.

Besides, another embodiment can be considered in which after the vertical frame is eliminated and a robot with multiple joints is installed at one end of the vertical frame, a camera is loaded onto the end of the arm of the robot.

INDUSTRIAL APPLICABILITY

According to the present invention, the apparatus and method for generating 3-dimensional image creates 3D images, which consumers can see with its actual views by rotating at a wanted angle.

The present invention further provides an apparatus and method for generating 3-dimensional image enable to minimize creation cost, operation time, and operator's tasking endeavor.

The present invention further provides an apparatus and method for generating 3-dimensional image enable to create 3D image easily even if the consumer is a beginner not familiar with operation control of 3D image generating device.

The present invention further provides an apparatus and method for generating 3-dimensional image enable to maximize operator's convenience by operating automatically to photograph an object at a wanted-angle with only one command.

The present invention further provides an apparatus and method for generating 3-dimensional image enable for accurate photographing by adjusting photographing location, rotation velocity, and the like precisely even if an object to be photographed is rotating.

The present invention further provides an apparatus and method for generating 3-dimensional image enable to perform an appropriate photographing by automatically detecting information about a photographic object (for example, size, width, shape, etc.) without additional input.

The present invention further provides an apparatus and method for generating 3-dimensional image enable to create a 3D image promptly with sharp cuts in time by photographing a plurality of images of an object simultaneously at different angles.

According to the present invention, since he camera part is supported more stably, the life cycle of the device may be prolonged and it provides 3-dimensional image with accurateness and high quality by operating more precisely.

It is apparent that the present invention is not limited to the aforementioned embodiments and those who skilled in the art can make various changes and modifications without departing from the scope and spirit of the present invention.

What is claimed is:

1. A method of generating 3-dimensional images of a photographic object, using an image management device and an image photographing part comprising: a turn table part; a camera part; a cylinder fitted with a support mechanism; a piston fitted with the cylinder and fixed with the camera part at one end thereof; a y-axis adjustment part; a x-axis adjustment part; and a photographing angle adjustment part, comprising the steps of:
   (a) transmitting movement control signals from the image management device to the image photographing part, where the movement control signals comprise a camera location control signal, a photographing angle control signal, and a turn table control signal;
   (b) rotating the turn table part a fixed speed and at a variable rotation angle, both corresponding to the movement control signals;
   (c) adjusting the height of the camera part corresponding to the movement control signals using the y-axis adjustment part;
   (d) adjusting a proximate position of the camera part corresponding to the movement control signals using the x-axis adjustment part, where the proximate position is a distance between the camera part and the photographic object;
   (e) adjusting a photographing angle of the camera part corresponding to the movement control signals using the photographing angle adjustment part, wherein the photographing angle is an angle that makes the internal central points of the camera part and the photographic object form a straight line;
   (f) generating a digital image by photographing an object at a pre-adjusted height, position, and photographing angle;
   (g) transmitting the generated digital image to the image management device; and
   (h) repeating step (a) to said step (g) until all the digital images necessary to generate 3-dimensional images are generated corresponding to the photographic object, wherein the movement control signal is updated whenever the digital image is generated.

2. The method of generating 3-dimensional images according to claim 1, further comprising the steps of:
   storing the digital image in the image management device; and
   generating 3-dimensional images by employing the stored plurality of digital images.

3. The method of generating 3-dimensional images according to claim 2, wherein the digital image is stored corresponding to rotation speed data or rotation angle data of the turn table part, height data of the camera part, and proximate position data of the camera part and the 3-dimensional images are generated by employing rotation speed data or rotation angle data of the turn table part, height data of the camera part, and proximate position data of the camera part.

4. The method for-of generating 3-dimensional images according to claim 2, further comprising the steps of:
   displaying the 3-dimensional images in a display part of the image management device;
   receiving a display status changing command of the 3-dimensional images, where the display status changing command is selected from a group consisting of expansion, reduction and rotation; and
   displaying 3-dimensional images whose display status is changed corresponding to the display status changing command in the display part.

5. The method of generating 3-dimensional images according to claim 1, wherein (a) to steps (g) are performed simultaneously.

6. The method of generating 3-dimensional images according to claim 1, wherein while the turn table part rotates at a fixed speed, the camera part photographs digital images corresponding to all angles of the photographic object at a first height and then, the camera part photographs digital images corresponding to all angles of the photographic object at a second height.

7. The method of generating 3-dimensional images corresponding to claim 1, wherein while the turn table part rotates at a first rotating angle, digital images corresponding to all sides of the photographic object are photographed and then, while the turn table part stands by rotating at a second rotating angle, digital images corresponding to all sides of the photographic object are photographed.

8. The method of generating 3-dimensional images corresponding to claim 2, wherein the 3-dimensional image is a single compressed file form.

9. The method of generating 3-dimensional images corresponding to claim 1, wherein the image management device is one selected from a group consisting of a computer, a mobile communication terminal, and a personal digital assistant (PDA).

10. The method of generating 3-dimensional images corresponding to claim 1, wherein size of the photographic object is determined in accordance with detection signals of a sensor attached to the camera part.

11. A system for generating 3-dimensional images comprising:
   an image photographing part comprising a camera part, a turn table part arranged a certain distance apart from the camera part, a photographing angle adjustment part enabled to rotate the camera part vertically, the x-axis adjustment part enabled to move the camera part forward or backward horizontally against the turn table part, and the y-axis adjustment part enabled to move the camera part vertically against the turn table part device, in which the camera part is joined with the photographing angle adjustment part, the x-axis adjustment part and the y-axis adjustment part and the photographic object is placed on top of the turn table part;
   an image photographing control part that generates a movement control signal, transmits to an image photographing part, and receives a plurality of digital images photographed by the camera part, wherein the movement control signal includes camera location control signal, photographing angle control signal, and turn table control signal;
   a 3 dimensional image creating part that generates 3-dimensional images by using the plurality of digital images; and
   a storage part that stores the plurality of digital images and 3-dimensional images; and
   a cylinder fitted with a support mechanism, and a piston fitted with the cylinder and fixed with the camera part at one end thereof.

12. The system for generating 3-dimensional images of claim 11, wherein as the turn table part rotates at a fixed speed or at a rotation angle corresponding to the movement control signal, the y-axis adjustment part, the x-axis adjustment part, and the photographing angle adjustment part adjusts height, proximate position and photographing angle of the camera part, and the camera part at the adjusted height, proximate position, and photographing angle, photographs the photographic object and then transmits the created digital images to the image photographing control part.

13. The system for generating 3-dimensional images of claim 11, wherein the x-axis adjustment part and the y-axis adjustment part comprise a guide rail, the support mechanism fitted with the guide rail and moveable along the guide rail.

14. The system for generating 3-dimensional images of claim 11, wherein the x-axis adjustment part and the y-axis adjustment part comprise a multiple joint robot fixed with the camera part at one end thereof.

15. The system for generating 3-dimensional images of claim 11, wherein the x-axis adjustment part and the y-axis adjustment part comprise a guide rail, a support mechanism fitted with the guide rail and moveable along the guide rail, a pair of screws arranged in a row with the support mechanism and enabled to rotate by a driving means, a pair of sliders inserted into the screw and moving in an opposite direction from the rotation direction of the screw, a link jointed with at least one hinge at one end of the pair of sliders, and a camera supporting plate jointed with at least one hinge of the other ends of the link.

16. A device for generating 3-dimensional images where it is joined with an image management device and photographs an object in order to create 3 dimensional images, comprising:
  a turn table drive part that rotates a turn table supporting a photographic object at a fixed speed or at a rotating angle corresponding to a movement control signal received from the image management device;
  a camera part that photographs the photographic object, generates digital images, and transmits the generated digital images to the image management device;
  a y-axis adjustment part that adjusts height of camera part corresponding to the movement control signal;
  an x-axis adjustment part that adjusts proximate position of the camera part corresponding to the movement control signal, where the proximate position is a distance between the camera part and the photographic object;
  a photographing angle adjustment part that adjusts a photographing angle of the camera part corresponding to the movement control signal, where the photographing angle is an angle that makes the internal central points of the camera part and the photographic object form a straight line, wherein the camera part is joined with the photographing angle adjustment part, the x-axis adjustment part, the y-axis adjustment part, and the movement control signal is updated whenever a digital image is generated; and
  a cylinder fitted with a support mechanism, and a piston fitted with the cylinder and fixed with the camera part at one end thereof.

17. A recording medium for recording a program of commands, where the program of commands is enabled to be executed in an image management device in order to execute the process for generating 3-dimensional images, is embodied materially, and the recording medium is decoded by the image management device, comprising the steps of:
  transmitting an image generated by a movement control signal to an image photographing part;
  receiving a plurality of digital images corresponding to a photographic object from the image photographing part;
  storing the plural digital images; and
  generating 3-dimensional images by employing the plurality of digital images, wherein the image photographing part comprises a turn table part, a camera part, a cylinder fitted with a support mechanism, a piston filled with the cylinder and fixed with the camera part at one end thereof, a photographing angle adjustment part, x-axis adjustment part, and a y-axis adjustment part; when the turn table part stands by in the state of rotating at a fixed speed or at a rotation angle corresponding to the movement control signal, the photographing angle adjustment part, x-axis adjustment part, and y-axis adjustment part adjust height, proximate position and photographing angle of the camera part; and the camera part photographs the photographic object at the adjusted height, proximate position and photographing angle and then transmits a generated digital image.

* * * * *

UNITED STATES PATENT AND TRADEMARK OFFICE
CERTIFICATE OF CORRECTION

PATENT NO. : 7,394,977 B2  Page 1 of 1
APPLICATION NO. : 10/574705
DATED : July 1, 2008
INVENTOR(S) : Sung-Joo Park et al.

It is certified that error appears in the above-identified patent and that said Letters Patent is hereby corrected as shown below:

In claim 4, column 15, line 64, "method for-of" should read --method of--.

In claim 5, column 16, line 9, "wherein (a)" should read --wherein steps (a)--.

In claim 6, column 16, line 15, "then, the" should read --then the--.

In claim 11, column 16, line 60, "images; and" should read --images;--.

In claim 17, column 18, line 26, "plural digital" should read --plurality of digital--.

In claim 17, column 18, line 32, "x-axis" should read --a x-axis--.

Signed and Sealed this

Twenty-fourth Day of February, 2009

JOHN DOLL
*Acting Director of the United States Patent and Trademark Office*